US010302876B2

(12) United States Patent
Grinderslev et al.

(10) Patent No.: US 10,302,876 B2
(45) Date of Patent: May 28, 2019

(54) MULTI-CHANNEL OPTICAL INSERT (75) Inventors: Soren Grinderslev, Shanghai (CN);
Lin Lin, Shanghai (CN)

(73) Assignees: TE Connectivity Corporation,
Berwyn, PA (US); **Tyco Electronics
(Shanghai) Co., LTD.**, Shanghai (CN)

( * ) Notice: Subject to any disclaimer, the term of this
patent is extended or adjusted under 35
U.S.C. 154(b) by 10 days.

(21) Appl. No.: 13/398,312

(22) Filed: Feb. 16, 2012

(65) Prior Publication Data
US 2013/0216189 A1 Aug. 22, 2013

(51) Int. Cl.
G02B 6/36 (2006.01)
G02B 6/38 (2006.01)
G02B 6/32 (2006.01)

(52) U.S. Cl.
CPC ............. *G02B 6/3879* (2013.01); *G02B 6/32*
(2013.01); *G02B 6/3672* (2013.01); *G02B
6/3825* (2013.01); *G02B 6/3885* (2013.01)

(58) Field of Classification Search
CPC .................................................... G02B 6/3879
See application file for complete search history.

(56) References Cited

U.S. PATENT DOCUMENTS

| 4,978,193 A * | 12/1990 | Tomita ............................ 385/55 |
| 5,222,168 A * | 6/1993 | Saito et al. ..................... 385/59 |
| 5,689,598 A * | 11/1997 | Dean et al. ..................... 385/59 |
| 5,870,515 A * | 2/1999 | Ott et al. ........................ 385/59 |
| 5,920,669 A * | 7/1999 | Knecht et al. .................. 385/76 |
| 5,923,802 A * | 7/1999 | Giebel et al. ................... 385/76 |
| 6,173,097 B1 | 6/2001 | Throckmorton et al. |
| 6,264,374 B1 * | 7/2001 | Selfridge et al. ............... 385/78 |
| 6,357,928 B1 * | 3/2002 | Haley et al. .................... 385/59 |
| 6,485,189 B1 * | 11/2002 | Gilliland et al. ............... 385/59 |
| 6,623,174 B2 | 9/2003 | Perko et al. |
| 7,031,567 B2 | 4/2006 | Grinderslev et al. |
| 7,520,678 B2 * | 4/2009 | Khemakhem et al. ......... 385/75 |
| 7,722,261 B2 | 5/2010 | Kadar-Kallen et al. |
| 7,775,725 B2 | 8/2010 | Grinderslev |
| 2002/0081066 A1 | 6/2002 | Brun et al. |
| 2003/0091297 A1 | 5/2003 | Hung et al. |
| 2004/0114877 A1 * | 6/2004 | Barnoski et al. ............... 385/78 |
| 2005/0169584 A1 * | 8/2005 | Takimoto et al. ............... 385/78 |

(Continued)

FOREIGN PATENT DOCUMENTS

EP 0 076 053 A2 4/1983
JP 05-297245 A 11/1993

(Continued)

OTHER PUBLICATIONS

International Search Report, International Application No. PCT/US2013/025539, International Filing Date Nov. 2, 2013.

*Primary Examiner* — Chris H Chu (57) ABSTRACT

A connector comprising a first outer housing defining at least one cavity, the cavity being cylindrical, a first insert disposed in the cavity, the first insert comprising at least a first housing, the housing being cylindrical, a first ferrule in the first housing, the first ferrule configured with arcuate sides to be received in the cavity, the first ferule comprising an end face, at least one alignment hole for receiving an alignment pin defined in the end face, and at least one fiber-receiving channel for receiving an optical fiber, an optical fiber disposed in the fiber-receiving channel of the first ferrule.

23 Claims, 9 Drawing Sheets

(56) References Cited

U.S. PATENT DOCUMENTS

| | | |
|---|---|---|
| 2012/0014645 A1 | 1/2012 | Kadar-Kallen |
| 2012/0020619 A1 | 1/2012 | Kadar-Kallen et al. |
| 2012/0033921 A1 | 2/2012 | Haley et al. |
| 2013/0121648 A1* | 5/2013 | Hung et al. .................... 385/79 |

FOREIGN PATENT DOCUMENTS

| | | |
|---|---|---|
| JP | 3106420 B2 | 11/2000 |
| JP | 2004-102072 A | 4/2004 |
| KR | 10-2007-0089238 A | 8/2007 |

\* cited by examiner

MULTI-CHANNEL OPTICAL INSERT

FIELD OF INVENTION

The present invention relates generally to ruggedized optical connectors, and, more specifically, to multi-channel ruggedized optical connectors.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein, are multi-cavity connectors. Such connectors typically comprise an outer housing defining a plurality of cavities for holding inner assemblies or "inserts." (See, e.g., U.S. Pat. No. 7,775,725, incorporated herein by reference.) Over the years, multi-cavity connectors have evolved into a ruggedized connector system, comprising an outer housing which is configured to mate with the outer housing of a mating connector, typically through a screw connection. Numerous United States Military specifications describe such multi-cavity connectors and fiber optic terminals, including, for example, MIL-C-38999, MIL-C-5015 and MIL-T-29504, among others.

Although such multi-cavity connector systems are commercially successful, Applicants have identified a need for multi-channel optical inserts that are interchangeable with traditional inserts and, thus, can be used in existing outer housings. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a multichannel optical insert for existing multi-cavity connectors, such as MIL 38999-type connectors. In particular, the present invention avoids the space constraints typically inherent in such inserts by configuring the insert with a multi-fiber ferrule having arcuate sides to conform to the cavity of the outer housing. This represents a departure from traditional optical connector configurations in which the ferrule would typically be contained within an insert housing and the insert housing would be configured to conform to the cavity. By configuring the ferrule to conform to the cavity rather than being contained within the insert housing, more area is afforded the ferrule end face to accommodate multiple fiber channels. Furthermore, by closely tolerancing the arcuate sides to conform to the cavity wall, the ferrule's position within the cavity can be controlled precisely.

Accordingly, one aspect of the invention is a connector system comprising an insert having ferrule with arcuate sides to conform to a cavity configured to hold the insert. In one embodiment, the connector system comprises: (a) a first outer housing defining at least one cavity, said cavity being cylindrical; and (b) a first insert disposed in said cavity, said first insert comprising at least: (i) a first housing, said housing being cylindrical; (ii) a first ferrule in said first housing, said first ferrule configured with arcuate sides to be received in said cavity, said first ferrule comprising an end face, at least one alignment hole for receiving an alignment pin defined in said end face, and at least one fiber-receiving channel for receiving an optical fiber; (iii) an optical fiber disposed in said fiber-receiving channel of said first ferrule; (c) a second outer housing defining at least one cavity, said cavity being cylindrical; and (d) a second insert disposed in said cavity, said second insert comprising at least: (i) a second housing, said housing being cylindrical; (ii) a second ferrule in said second housing, said second ferrule configured with arcuate sides to be received in said cavity, said second ferrule comprising an end face, at least one alignment hole for receiving an alignment pin defined in said end face, and at least one fiber-receiving channel for receiving an optical fiber; and (iii) an optical fiber disposed in said fiber-receiving channel of said second ferrule.

It should be apparent from the description herein that the insert and ferrule configuration of the present invention provides significant advantages over conventional insert configurations such as high channel density and interchangeability with existing connector components. Still other advantages of the insert and ferrule of the present invention are anticipated.

DETAILED DESCRIPTION

Referring to FIGS. 1-6, one embodiment of the connector system of the present invention is shown. The connector system comprises a first connector comprising a first outer housing 101 defining at least one cavity 104. In the cavity 104 is disposed a first insert 300, which, in this embodiment, happens to be a plug insert. The first insert 300 comprising a first cylindrical housing 301 and holding a first ferrule 302. The first ferrule 302 has arcuate sides 306 to be received snuggly in the cavity 104. The first ferule 302 also comprises an end face 307 and at least one first alignment hole 304 for receiving an alignment pin defined in said end face 307, and at least one fiber-receiving channel (see, e.g. channel 702, FIG. 7) for receiving an optical fiber (not shown).

In one embodiment, the connector system comprises a second connector. (Although the connector system of FIGS. 1-5 is shown with a second connector, the invention may be practiced with just one connector configured to mate with any mating structure, including, for example, other connectors, adapters, and adapters integrated with active or passive devices.) The second connector comprises a second outer housing 201 defining at least one cavity 204. In the cavity 204 is disposed at least a portion of a second insert 500, which, in this embodiment, happens to be a receptacle insert. The second insert 500 comprises a second cylindrical housing 501, having a first key 503 and holding a second ferrule 502. The second ferrule 502 has arcuate sides 506 to be received snuggly in said cavity 204 of said second outer housing 201. The second ferule comprises an end face 507 and at least one second alignment hole 504 for receiving an alignment pin 520, and at least one fiber-receiving channel (see, e.g. channel 702, FIG. 7) for receiving an optical fiber (not shown). In one embodiment, the first and second outer housings 101, 201 comprise a mechanical interengagement mechanism to connect said first and second outer housings in a mated state wherein said first and second ferrules are optically coupled. These elements are described in more detail below.

Figure 1A:
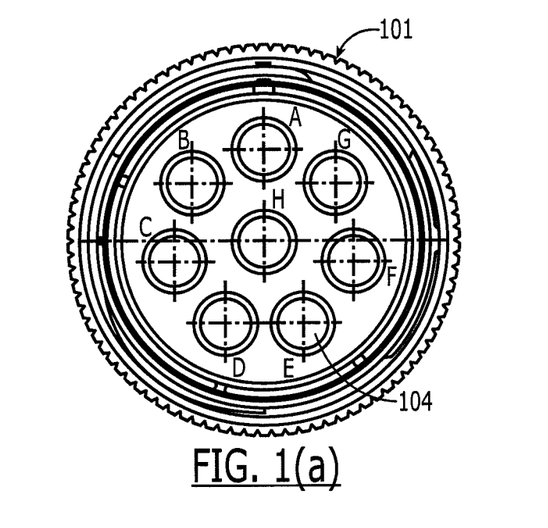
FIGS. 1(a) and 1(b) show a front view and a side view respectively of an outer housing of a plug connector embodiment of the present invention.
Figure 1B:
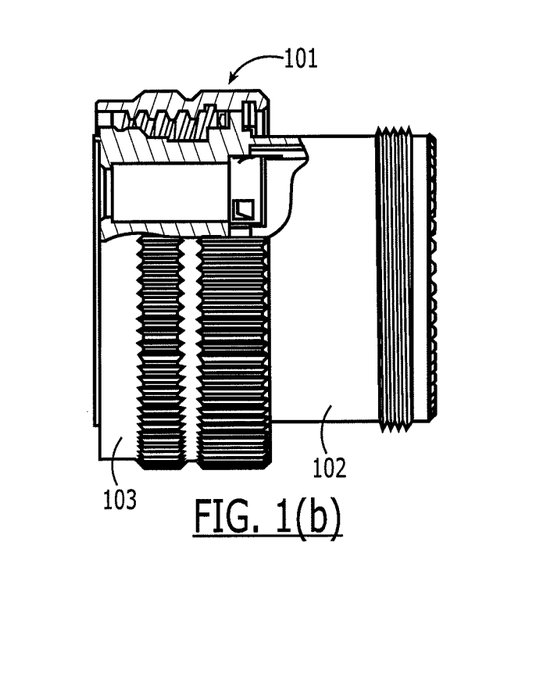

Referring to FIGS. 1(a) & (b) and 2(a) & (b), the first and second outer housings 101, 201 of the plug and receptacle embodiments of the connector of the present invention are shown. In one embodiment, the outer housings of the present invention function to hold the first/second inserts and to interconnect mechanically, thereby coupling the first insert(s) with the second insert(s) and effecting an optical connection therebetween.

Referring to FIG. 1(a), the first outer housing 101, which happens to be a plug outer housing in this embodiment, comprises one or more cavities 104. The number of cavities can vary from embodiment to embodiment, ranging from one to ten or more. In the embodiment shown in FIG. 1(a), there are eight (8) cavities. In this embodiment, the cavities 104 have a cylindrical shape and thus are adapted to receive cylindrical-shaped inserts (discussed below). It should be understood that the cavities 104 are configured to receive either electrical or optical inserts as described herein. Therefore, a given outer housing 101 may contain a combination of electrical and optical first inserts in various cavities 104.

Figure 2A:
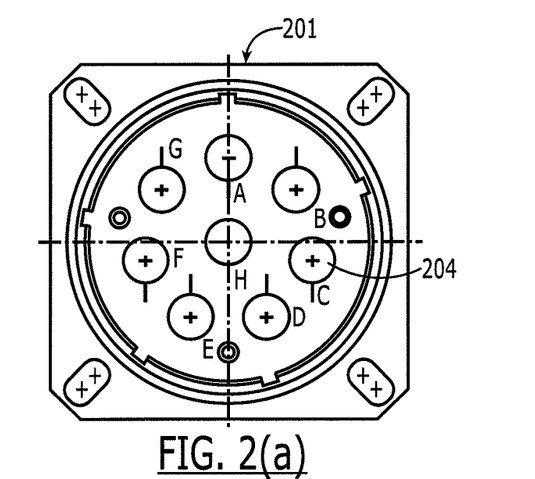
FIGS. 2(a) and (b) show a front view and a cross-section side view respectively of an outer housing of a receptacle embodiment of the present invention.
Figure 2B:
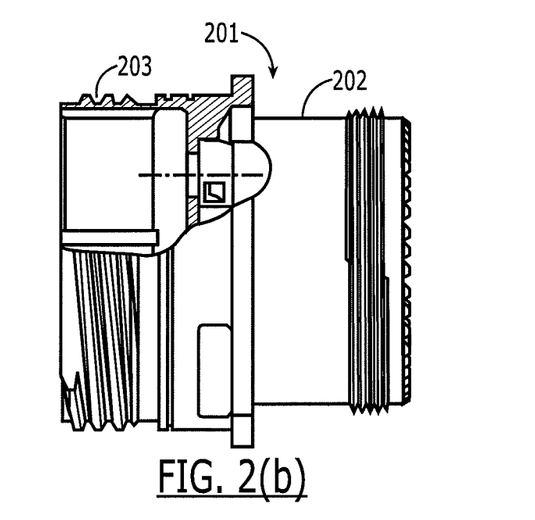

Referring to FIG. 2(a), shown is a second outer housing, which happens to be a receptacle outer housing in this embodiment. Like the first outer housing 101, the second outer housing 201 comprises one or more cavities 204, in which second inserts (described below) can be disposed. Also, like the first outer housing 101, the cavities are cylindrical in shape and are adapted to receive either electrical or optical inserts.

Figure 8:
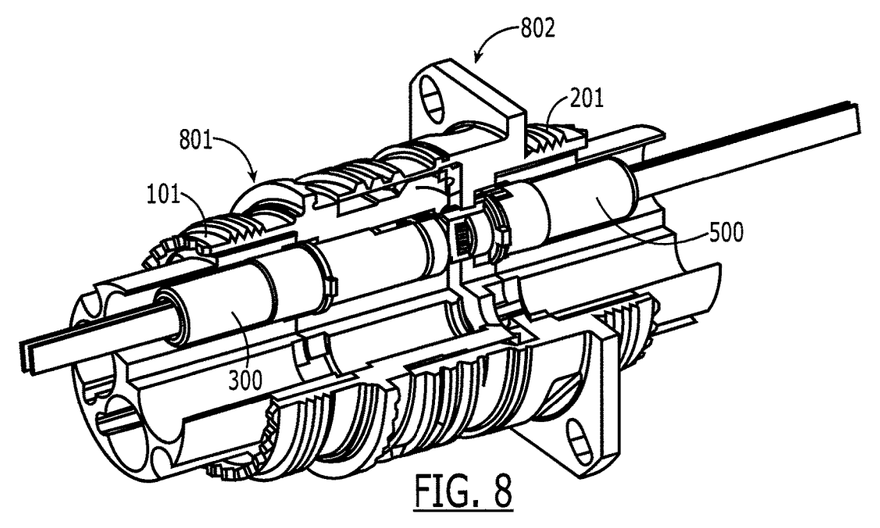
FIG. 8 shows the outer housings of FIGS. 1 and 2 in a mated state with phantom lines showing the interconnection of the plug and second inserts of FIGS. 3 and 5 respectively.

As mentioned above, in one embodiment, the outer housings comprise means for interconnecting the first outer housing 101 with the receptacle housing 201. To this end, in one embodiment, the outer housing 101 comprises a nut 103 rotatably connected to a body member 102. The outer housing 201 comprises a body 202 having threads 203 defined on a forward portion thereof for interengagement with the nut 103. Such a configuration is well known in the art. When the first and second outer housings are connected via the nut 103 interengaging with the threads 203, the first and second connectors are in a mated state as shown in FIG. 8. Furthermore, in one embodiment, the first and second outer housings are keyed to ensure the ferrules are pre-aligned. Specifically, in one embodiment, the outer housing 101 has keys and the second outer housing has key ways. After the keying between the two outer housings is initiated, the nut on 101 is used to engage the plug unit onto the receptacle unit.

In one embodiment, the outer housings 101, 102 are configured to comply with common specifications with industry standard connected configurations. For example, in one embodiment, the connector is configured to comply with the MIL-38999 standard.

Figure 3:
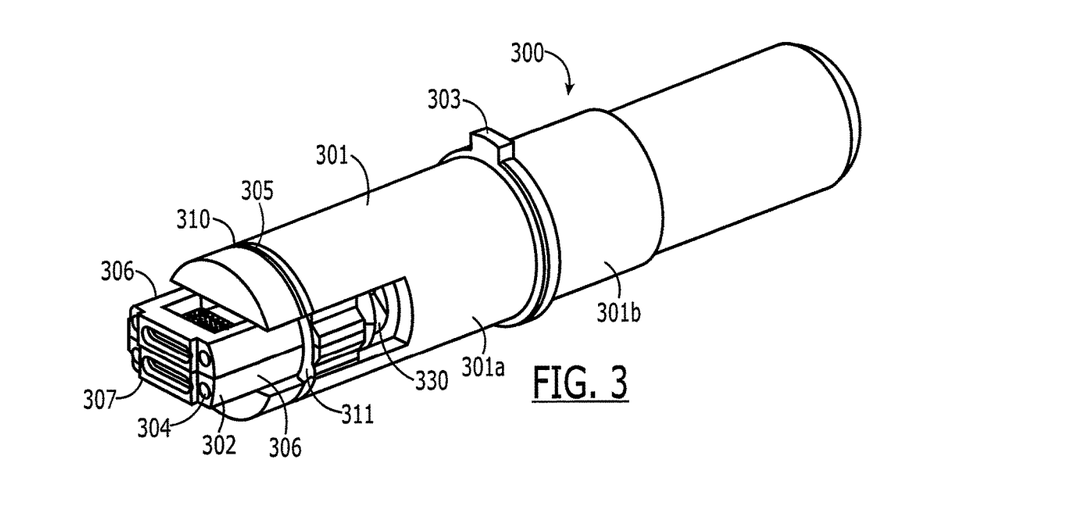
FIG. 3 shows a perspective view of a first insert embodiment of the present invention.
Figure 4:
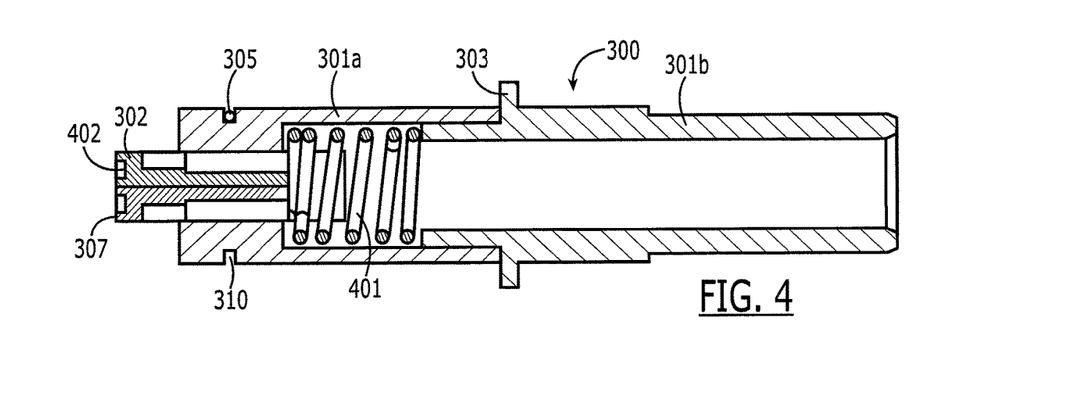
FIG. 4 shows a cross-sectional side view of the first insert of FIG. 3.

Referring to FIGS. 3 and 4, a perspective view and a cut away side view of the first insert 300 is shown. In this particular embodiment, the first insert 300 is plug insert. In one embodiment, the first insert 300 comprises a housing 301 which contains and holds the ferrule 302.

Figure 14:
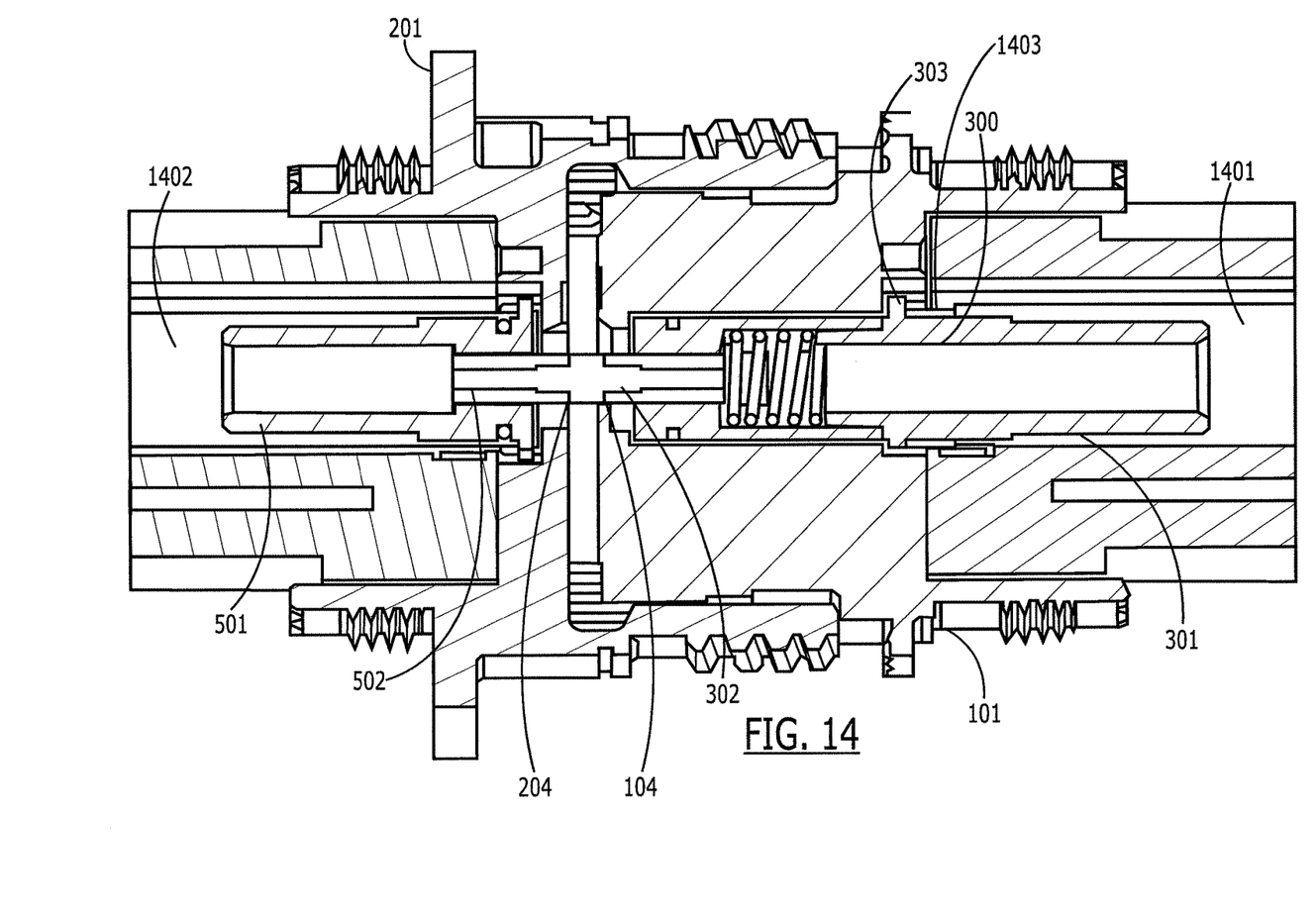
FIG. 14 shows one embodiment of the connectors of the present invention in their mated state.

The outer periphery of first insert 300 is configured to be received in the outer housing 101. In one embodiment, the outer housing comprises cavity 104 which receives the ferrule 302 and another larger cavity to receive the first housing 301. Specifically, referring to FIG. 14, the first and second connectors are shown in their mated state. The first and second outer housings 101, 201 comprise secondary cavities 1401, 1402 to receive the housings 301, 501. In this embodiment, the secondary cavities 1401, 1402 are slightly larger than the cavities 104, 204 to allow the housings 301, 501 to be inserted readily.

As mentioned above, the sides 306 of the ferrule 302 are arcuate to conform to the cavity 104. More specifically, although multi-fiber ferrules are typically rectilinear, and, thus, not configured to fit into a cylindrical cavity, the ferrule 302 of the present invention has arcuate sides 306, which are essentially flush with the periphery of the housing 301. The arcuate sides not only facilitate the insertion of the insert into the cylindrical cavity 104, but also serve to position the ferrule within the cavity. In other words, the arcuate sides of ferrule contact the wall of the cavity and serve to position the ferrule within the cavity. Accordingly, in one arcuate embodiment, the arcuate sides have a radius of curvature that is nearly the same as the radius of the cavity. (Due to manufacturing tolerances of both parts, it is preferred, although not necessary, to keep the radius of the ferrule sides slightly less to assure successful insertion at worst case tolerances).

The ferrule may be secured to the housing in a variety of ways. For example, in this particular embodiment, the housing comprises a groove 310 which cooperates with the arcuate sides of the ferrule. Specifically, the arcuate radius of the ferrule has the same radius as the groove so the retainer clip 305, when seated, rests against the bottom of the groove and the arcuate sides of the ferrule at the same time. The retainer clip functions to center the ferrule and prevent it from being pulled out of the housing front by virtue of ferrule shoulder 703 (see FIG. 7) interfering with the clip 305.

In one embodiment, the first insert 300 comprises an alignment mechanism for ensuring that the insert is radially positioned within the cavity 104. To this end, in one embodiment, the alignment mechanism comprises a key 303, which, in this particular embodiment, is a protrusion from the housing 301 of the insert 300. The outer housing 101 defines a corresponding slot 1403 (see FIG. 14) to receive the key 303 such that when the insert is disposed in the cavity 204 the radial position of the insert relative to the housing 201 is maintained by virtue of the key 303 being within the slot 1403. It should be understood that, although the key 303 is depicted as a protrusion in this embodiment, alternative embodiments exist. For example, rather than the housing having the protruding key, the cavity may have the protruding key and the housing 301 may have a slot to receive the key. Still other embodiments will be known to those of skill in the art in light of this disclosure.

In one embodiment, the first insert 300 is configured to bias the ferrule 302 forward. Specifically, Applicants have found that the mechanism of securing the insert in the cavity (usually a clip) results in significant axial tolerance build up, and, therefore, physical contact between the second insert 500 (described below) and the first insert 300 is not assured. Accordingly, in one embodiment, applicant has solved this problem by forward biasing the ferrules of at least one of the inserts forward. To this end, referring to FIG. 4, a spring 401 is used to bias the ferrule 302 forward. More specifically, in this embodiment, the housing 301 is divided into two portions, a front portion 301(*a*) and a rear portion 301(*b*). The front and rear portions are press fit together with an interference fit. The ferrule is slidably secured within a mounting slot 330 of the front portion 301*a*. The spring biases the ferrule forward.

In the insert embodiments shown in this FIGS. 3-6, only the first insert 300 is forwardly biased. Such an embodiment has certain benefits in that the first outer housing 101 is axially longer than the second outer housing 201 by virtue of the nut 103. This additional length protects the elongated first insert 300, and particularly the ferrule, which is longer that the second insert 500 because of the spring mechanism. Although this embodiment depicts just the first insert as biased forward, it should be understood that other embodiments are possible. For example, just the second insert 500 may be biased or both inserts may be biased forward.

Figure 5:
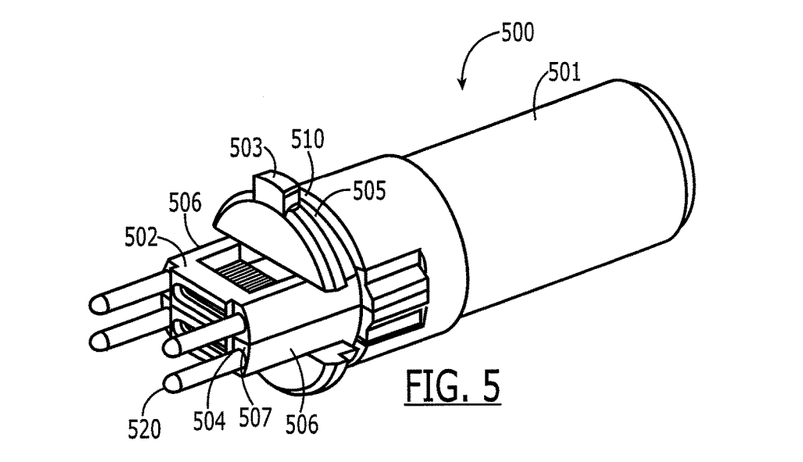
FIG. 5 shows a perspective view of a receptacle insert embodiment of the present invention.
Figure 6:
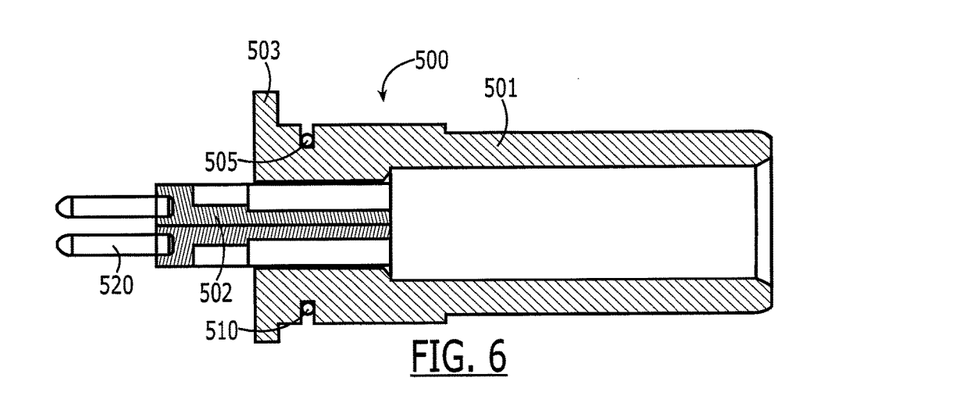
FIG. 6 shows a cross-sectional side view of the first insert of FIG. 5.

Referring to FIGS. 5 and 6, the second insert 500 is disclosed. The second insert 500 comprises a housing 501, which holds a ferrule 502. Like ferrule 302, the sides 506 of ferrule 502 are arcuate such that the ferrule is received in the cavity 204 similar to the ferrule 302 being received in cavity 104. In this embodiment, the second insert 500, like the first insert 300 comprises a key 503 which is received in a corresponding slot within the cavity 204 such that, when the insert 500 is disposed in the cavity 204, the key 503 and the corresponding slot (not shown) function to radially align the insert 500 within the cavity 204.

Similar to clip 305 as described in the environment of FIG. 3, the second insert 500 comprises a groove 510 in the housing 501 which cooperates with the arcuate sides of the ferrule. Like the first insert, the arcuate radius of the ferrule has the same radius as the groove so the retainer clip 505, when seated, rests against the bottom of the groove and the arcuate sides of the ferrule at the same time.

As mentioned above, the first and second inserts 300, 500 function to secure the optical fibers and facilitate their optical coupling. In one embodiment, to facilitate optical coupling between the ferrules 302, 502 of inserts 300, 500, the ferrule comprises an alignment mechanism 304 for aligning the ferrule 302 of the first insert 300 with the corresponding ferrule 502 of the second insert 500 (described below). In this particular embodiment, the alignment mechanism is an alignment hole/alignment pin. Specifically, ferrule 302 comprises an alignment hole 304, which is adapted to receive an alignment pin 520 (shown in FIG. 5). As described above, when the inserts are in their mated state, the alignment pin 520 is received in alignment hole 304, thereby optically coupling the fibers in the first insert 300 with those in the second insert 500. The use of alignment holes and pins is well known in the art and will not be described in detail. However, the use of such mechanism in a connector such as a 38999-type connector represents a break from traditional designs. Although, in this embodiment, ferrule 302 comprises the alignment hole 304 which receives the alignment pin 520 (see FIG. 5), it should be appreciated that the alignment pins may be disposed in alignment hole 304 instead, such that ferrule 302 has protruding alignment pins, which are received in corresponding alignment holes in the ferrule 502 of the second insert 500.

Figure 7:
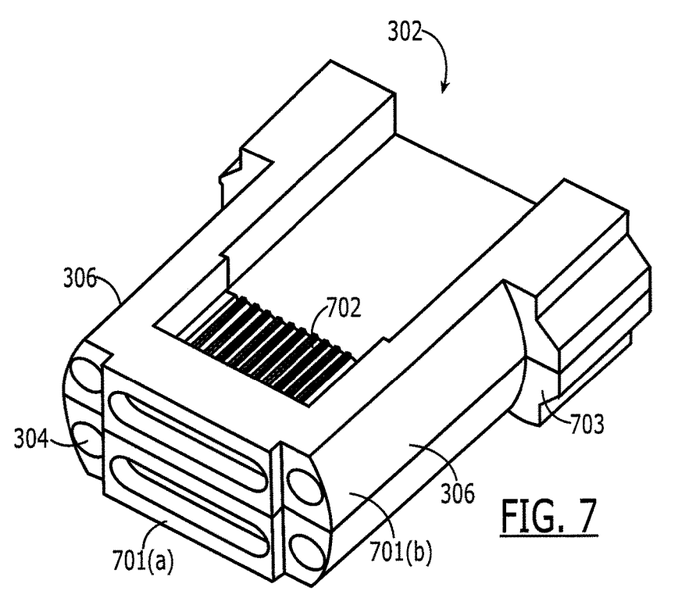
FIG. 7 shows one embodiment of a ferrule of the present invention as used in the embodiments shown in FIGS. 4 and 6.

Referring to FIG. 7, the ferrule of the first and second inserts 300, 500 is shown. The ferrule 302 comprises arcuate sides 306 as mentioned above. It is important that the sides 306 are arcuate such that the ferrule can be received in the cylindrical cavity of the outer housing as described above. The arcuate sidewalls can be configured in different ways. For example, a rectilinear ferrule 302 may be molded and then the arcuate walls 306 machined thereafter. Alternatively, the arcuate walls 306 may be molded initially in the ferrule 302. Still other techniques for providing arcuate walls 306 may be used.

In this particular embodiment, the ferrule 302 comprises two discrete ferrules 701(*a*) and 701(*b*). The discrete ferrules 701(*a*) and 701(*b*) are stacked over/under. Even though the ferrules 701(*a*) and 701(*b*) are discrete, when they are stacked, they should have common, continuous, arcuate sides 306 as shown. Accordingly, in one embodiment, the arcuate sidewalls 306 are machined after the discrete ferrules 701(*a*), 701(*b*) are stacked. Alternatively, the sidewalls 306 in discrete ferrules 701(*a*), 701(*b*) may be machined prior to stacking, although aligning the ferrules once their ends 306 are machined may be problematic and not as accurate as aligning them in their initial rectilinear form. Still another embodiment involves not machining the walls, but rather molding the ferrules 701(*a*), 701(*b*) with the arcuate walls as shown.

The discrete ferrules 701(*a*), 701(*b*) comprise at least one fiber channel 702 for receiving and holding a fiber.

In one embodiment, the inserts have lenses to provide for an expanded beam optical coupling between the inserts. Such expanded beam connectors are more resilient to dirt arcuate and vibration, and thus are suitable for rugged conditions. Specifically, by expanding the beam, the beam's relative size increases with respect to the debris, making it less susceptible to interference. Further, transmitting the beam over an air gap eliminates component-to-component wear, thereby increasing the connector's endurance to vibration. The use of lenses to achieve an expanded beam optical coupling is known and disclosed, for example, in U.S. Pat. Nos. 7,722,261 and 7,775,725, incorporated herein by reference.

Referring to FIG. 4, a cross-section of the ferrule 302 is shown. In this particular embodiment, ferrule 302 comprises a series of lenses 402 for optically coupling the fiber held in the ferrule with that of the second insert 500 described below. Ferrules having molded lenses are known and disclosed, for example, in U.S. application Ser. Nos. 12/836,067, 12/842,768, and 12/855,261, each of which is hereby incorporated by reference.

In this particular embodiment, the discrete ferrules 701(*a*), 701(*b*) are TELLMI brand ferrules, which are commercially available through TE Connectivity (Harrisburg, Pa.). Although two stacked ferrules are shown in FIG. 7, it should be noted that the invention is not limited to two stacked ferrules, and any number of ferrules may be stacked provided that the stack can be inserted into the cavity as described above (after the sides are configured to be arcuate as described above).

Figure 9:
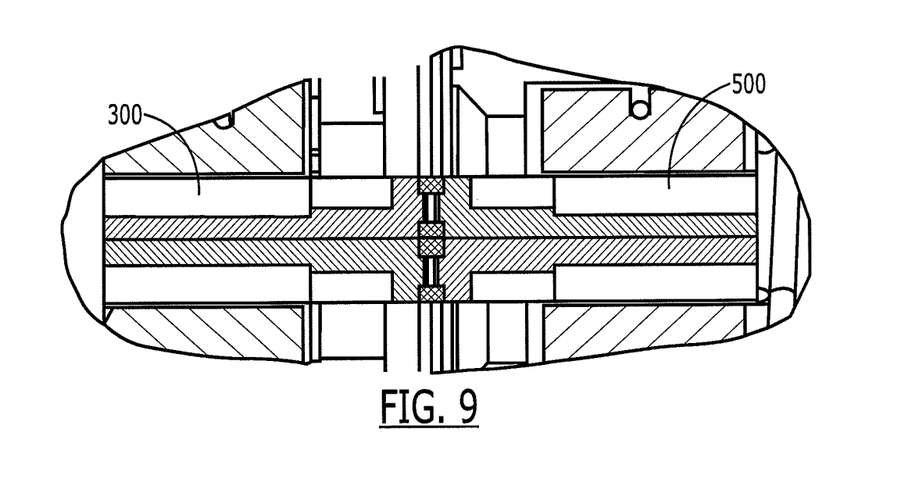
FIG. 9 shows a close-up, cut away view from FIG. 8 of the plug and second inserts interconnected in the mating state.

Referring to FIG. 8, the outer housings 101 and 201 are shown in their mated state in which the nut 103 is interengaged with the threads 203 to secure the outer housings together, thereby forming a mated assembly 801. As shown in phantom line in FIG. 8, and in cross-section of FIG. 9, the first insert 300 and the second insert 500 are optically coupled when the outer housings 101, 201 are in their mated state. Accordingly, the alignment mechanisms as described above with respect to inserts 300, 500 are interengaged to ensure that each fiber of the first insert 300 is aligned and optically coupled with a corresponding fiber in the second insert 500.

Figure 10:
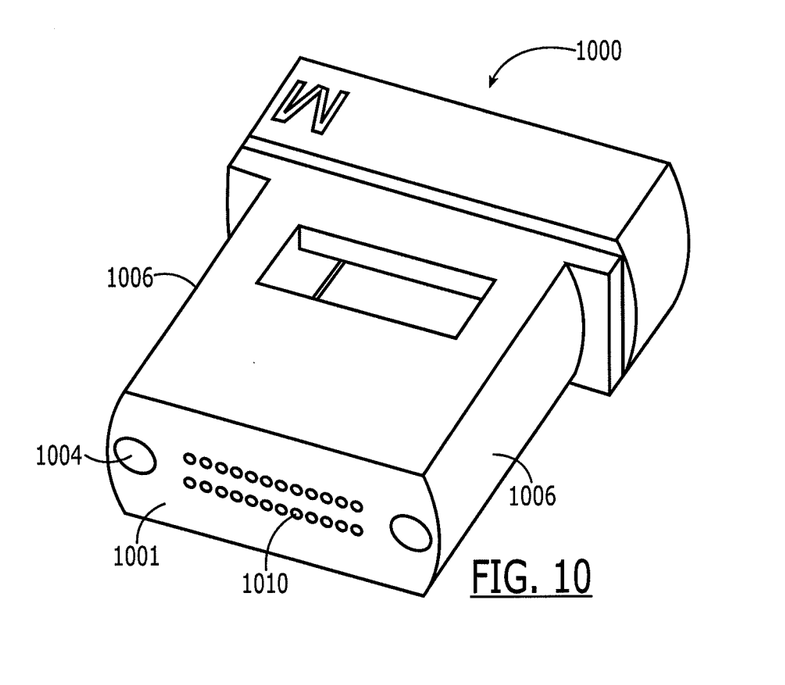
FIG. 10 shows an alternative embodiment of the ferrule of the present invention.

Referring to FIG. 10, another embodiment of a ferrule 1000 of the present invention is shown. In this embodiment, the ferrule 1000 is an MT-type ferrule having an end-face 1001 with one or more rows of fiber-receiving channels, each channel configured to receive a fiber. Like the ferrule 302, ferrule 1000 comprises arcuate sides 1006 configured to be received in the cavity of the outer housing as described above. The MT ferrule also comprises alignment holes 1004 for receiving alignment pins as described above. Also as described above, the alignment holes 1004 can be occupied with an alignment pin or be left vacant to receive the alignment pin. MT-type ferrules are well known and commercially available from US Conec, among others. Unlike ferrule 302, ferrule 1000 does not comprise molded lenses, but rather presents the end face of each fiber 1010 in the end face 1001 of the ferrule. Such a configuration allows the end face 1001 to be configured with any known end face geometry using known techniques and apparatus. For example, the end face 1001 (and the corresponding end face in the mating structure) may be polished to have a flat or curved end face or an APC end face. Furthermore, if an expanded beam connector is desired, a graded index (GRIN) fiber stub may be inserted at the end of each fiber channel at the ferrule end face. The use of a GRIN fiber stub to facilitate an expanded beam optical coupling is known and disclosed, for example, in U.S. Pat. No. 7,031,567, incorporated herein by reference.

As mentioned above, the connector configuration of the present invention is particularly well suited for rugged applications involving dirt, vibration or frequent impacts. Accordingly, although physical contact between optical connectors is often preferred to reduce Fresnel losses, in rugged applications, it may be desirable (although not necessary) for the fiber end faces to avoid contact. With respect to the ferrule 302 depicted in FIG. 7, an air gap is provided between the lenses of mating ferrules by virtue of the lenses being recessed rearward from the ferrule end face 701. Accordingly, when the ferrules 302, 502 of the first and second inserts 300, 500 are mated, even though the ferrule end faces may contact each other, the lenses are separated by an air gap and thus impervious to vibration and other shocks which may cause damage to the delicate lens configuration.

Likewise, in the embodiment of the ferrule 1000, it is preferable in certain applications that the fiber end faces at the ferrule end face 1001 avoid physical contact. Various means may be used to ensure that physical contact is avoided. For example, during the polishing process of the MT ferrule (which is a well-known process), certain grits and pressures may be applied to ensure sufficient undercut of the fibers such that the end face of each fiber is below the surface of the ferrule end face. Thus, when in the mated state, although the ferrule end faces may contact each other, the end face of the fibers will be separated by a small air gap. Rather than relying on undercut polishing, in another embodiment, physical contact between the end faces of the fiber 110 is avoided by applying an index matching film between the mating ferrules of the first and second inserts. Such an index-matching film is known in the art and disclosed for example in U.S. Pat. No. 6,623,174, herein incorporated by reference. In yet another embodiment, physical contact is avoided by providing a spacer between the ferrules to ensure their end faces do not contact. Such a spacer may include, for example, a washer or similar annular component around the alignment pins. Alternatively, fiducials or a raised structure may be machined or deposited on the end face 1001 to ensure the end faces of mating ferrules do not touch. Still other embodiments and approaches for avoiding physical contact between the fiber end faces will be known to those of skill in the art in light of this disclosure.

Figure 11:
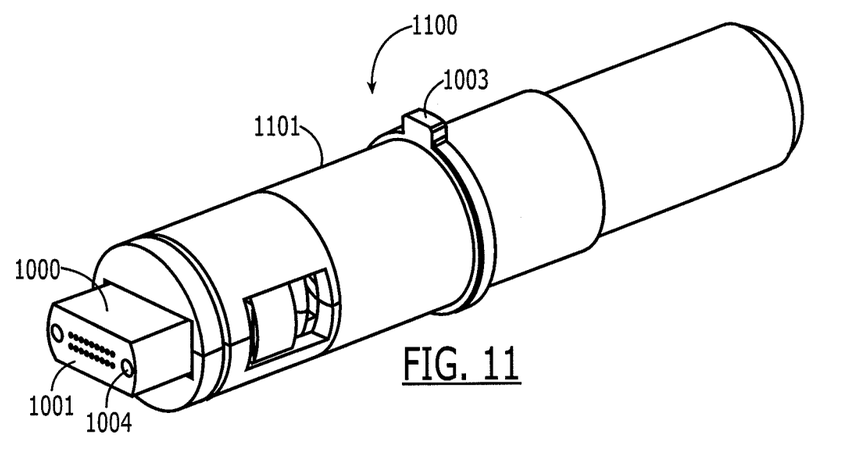
FIG. 11 shows a perspective view of a first insert embodiment of the present invention having the ferrule of FIG. 10.
Figure 12:
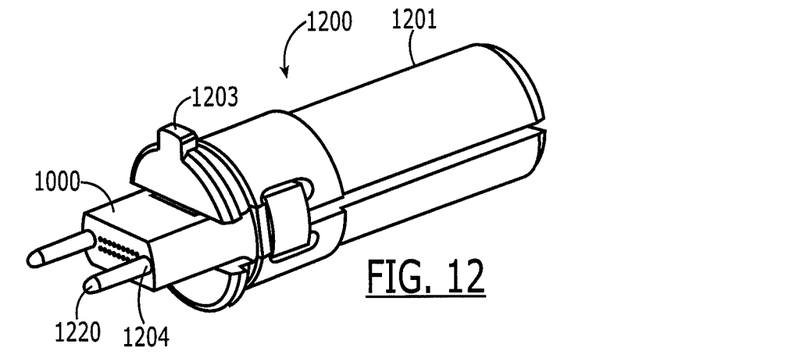
FIG. 12 shows a perspective view of a first insert embodiment of the present invention having the ferrule of FIG. 10.

Referring to FIG. 11, a first insert 1100 is shown with a ferrule 1000 held in a housing 1001. As with the insert 300, a key 1003 is defined on the outer surface of the housing 1001 to ensure that the insert 1100 is radially aligned within the cavity of the outer housing. Referring to FIG. 12, the second insert 1200 is shown in which a housing 1201 holds the ferrule 1000 of FIG. 10, although in this embodiment, the alignment hole 1201 is occupied with an alignment pin 1220. Again, a key 1203 is defined on the outer perimeter of the housing 1201 to ensure radial alignment within the cavity of the outer housing as described above.

Figure 13A:
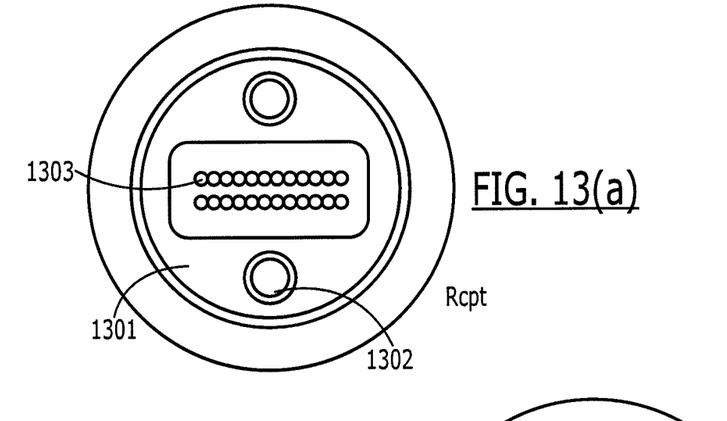
FIGS. 13(a)-(c) show alternative embodiments of the ferrule of the present invention.
Figure 13B:
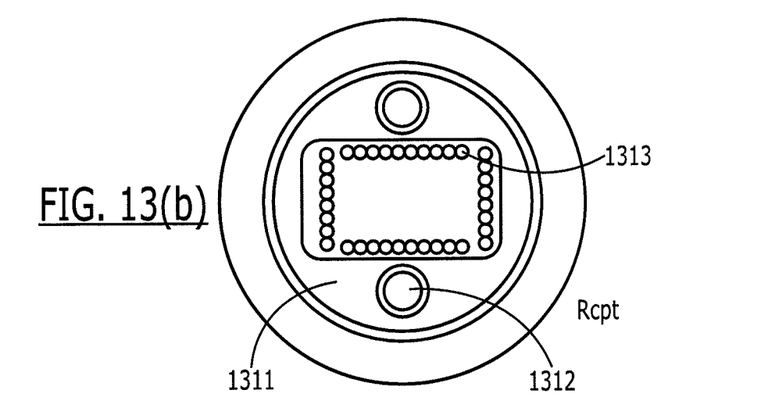
Figure 13C:
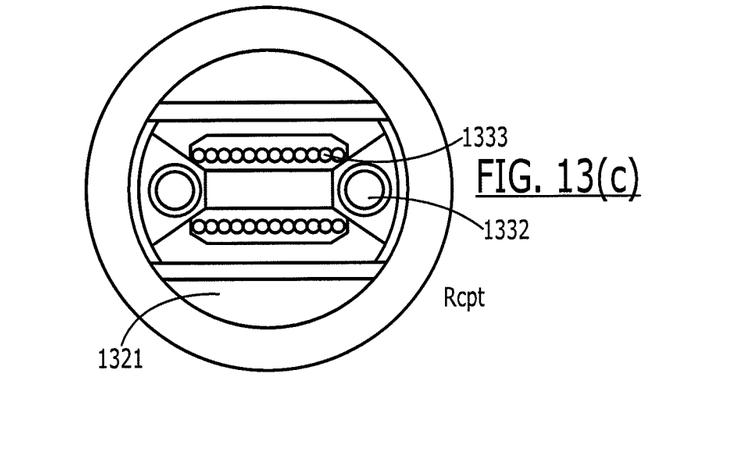

Referring to FIGS. 13(*a*)-(*c*), a variety of different ferrule configurations are shown for use in the cylindrical cavities of the outer housings 101, 201. Specifically, in FIG. 13(*a*), a ferrule 1301 is shown in which the alignment holes 1302 are above and below the rows of fiber-receiving channels 1303. In FIG. 13(*b*), the fiber-receiving channels 1313 in the ferrule 1311 form a rectangle and the alignment holes 1312 are adjacent to the long sides of the rectangle. In FIG. 13(*c*), the rows of fiber-receiving channels 1333 in the ferrule 1321 are separated more than the rows of fiber-receiving channels 1303 depicted in the ferrule 1301 of FIG. 13(*a*) to accommodate the alignment holes 1332 therebetween. Still other configurations exist, such as, for example, circular patterns of fiber channels or concentric circular patterns (not shown).

It should be apparent from the above description that the insert and ferrule configuration of the present invention provides significant advantages over conventional insert configurations such as high channel density and interchangeability with existing connector arcuate components. Still other advantages of the insert and ferrule of the present invention are anticipated.

What is claimed is:
1. A connector comprising:
   a first outer housing defining a plurality of cylindrical cavities having a cylindrical wall;
   a plurality of first inserts disposed in said cavities, each first insert comprising at least:

at least one first ferrule having arcuate sides, said first ferrule being received in said cavity such that said arcuate sides directly contact said cylindrical wall to position said first ferrule within said cavity, said first ferule comprising an end face, at least one alignment hole for receiving an alignment pin defined in said end face, and at least one fiber-receiving channel for receiving an optical fiber;

an optical fiber disposed in said fiber-receiving channel of said first ferrule.

2. The connector of claim 1, wherein said first ferrule comprises at least one lens to expand an optical beam exiting said optical fiber or to focus an expanded beam entering said optical fiber.

3. The connector of claim 2, wherein said lens is disposed on said end face of said first ferrule and aligned with said fiber-receiving channel, such that said lens is optically coupled with the optical fiber disposed in said fiber-receiving channel.

4. The connector of claim 3, wherein said first ferrule is a lensed multi-fiber interconnect lens type ferrule.

5. The connector of claim 2, wherein said lens comprises a GRIN lens in said fiber-receiving channel at said end face.

6. The connector of claim 1, wherein said first ferrule comprises a plurality of fiber-receiving channels, each with a fiber disposed therein.

7. The connector of claim 1, wherein said first ferrule is polished such that the terminal end of each fiber is undercut relative to said end face.

8. The connector of claim 1, wherein said first ferrule further comprises an alignment pin in said alignment hole.

9. The connector of claim 1, wherein said first ferrule comprises a plurality of stacked ferrules.

10. The connector of claim 1, wherein said cavity is a MIL-38999 Quadrax style cavity.

11. The connector of claim 1, wherein said first outer housing comprises a plurality of cavities and wherein said at least one first insert comprises a plurality of first inserts, each first insert being disposed in one of said plurality of cavities.

12. The connector of claim 11, wherein said cavities are occupied with a combination of optical inserts and electrical inserts.

13. The connector of claim 1, wherein said first insert further comprises a first housing having a first key and wherein said cavity comprises a corresponding key such that, when said first insert is disposed in said cavity, said first key and said corresponding key cooperate such that said first insert is aligned radially in said cavity.

14. The connector of claim 1, wherein said connector further comprises:

a second outer housing defining multiple cylindrical cavities having a cylindrical wall;

a plurality of second inserts disposed in said cavities, each second insert comprising at least:

a second ferrule having arcuate sides, said second ferrule being received in said cavity such that said arcuate sides directly contact said cylindrical wall to position said second ferrule within said cavity said second ferule comprising an end face, at least one alignment hole for receiving an alignment pin defined in said end face, and at least one fiber-receiving channel for receiving an optical fiber;

an optical fiber disposed in said fiber-receiving channel of said second ferrule.

15. The connector of claim 14, wherein said first and second outer housings comprise a mechanical interengagement mechanism to connect said first and second outer housings in a mated state, said first and second ferrules being optically coupled in said mated state.

16. The connector of claim 15, wherein said first outer housing comprises a nut configured to engage threads on said second outer housing.

17. The connector of claim 14, wherein one of said first or second ferrule is biased forward with a spring.

18. The connector of claim 17, wherein said first insert also comprises a first housing, wherein said first housing comprises a front portion and a rear portion, said front and rear portion being engaged through an interference fit, said front portion defining a slot, said first ferrule being attached to said front portion and slidably movable in said slot, said spring urging said front portion forward relative to said rear portion.

19. The connector of claim 14, further comprising a spacer to ensure said end faces of said first and second ferrules do not contact one another.

20. The connector of claim 14, further comprising an index matching film disposed between said first and second inserts.

21. The connector of claim 14, wherein said first insert is a plug insert and said second insert is a receptacle insert.

22. The connector of claim 1, wherein said top and bottom surfaces are both planar.

23. The connector of claim 22, wherein said top and bottom surfaces are parallel.

* * * * *